United States Patent [19]

Hervig

[11] 4,377,547
[45] Mar. 22, 1983

[54] MOLDED HIGH VOLTAGE SPLICE BODY

[75] Inventor: Harold C. Hervig, Maplewood, Minn.

[73] Assignee: Minnesota Mining and Manufacturing Company, St. Paul, Minn.

[21] Appl. No.: 340,513

[22] Filed: Jan. 18, 1982

[51] Int. Cl.³ .......................... B29C 5/00; B29D 3/00
[52] U.S. Cl. ................................. 264/262; 264/263; 264/266; 264/267; 264/269; 264/328.2
[58] Field of Search ............... 264/262, 328.2, 328.4, 264/314, 261, 263, 266, 267, 269

[56] References Cited

U.S. PATENT DOCUMENTS

| 2,312,993 | 3/1943 | Stephens | 264/269 |
|---|---|---|---|
| 3,015,855 | 1/1962 | Merkel | 264/314 |
| 3,135,640 | 6/1964 | Kerpa et al. | 264/314 |
| 3,184,528 | 5/1965 | Norwalk | 264/314 |
| 3,377,657 | 4/1968 | Richardson et al. | 264/314 |
| 3,561,079 | 2/1971 | Anderson | 264/314 |
| 3,607,494 | 9/1971 | Rowland | 264/269 |
| 3,651,180 | 3/1972 | Glueckert | 264/314 |
| 4,113,825 | 9/1978 | Hill et al. | 264/267 |
| 4,241,004 | 12/1980 | Hervig | 264/262 |
| 4,285,896 | 8/1981 | Miller et al. | 264/313 |

FOREIGN PATENT DOCUMENTS 7017737 6/1972 Fed. Rep. of Germany ...... 264/262

Primary Examiner—Willard E. Hoag
Attorney, Agent, or Firm—Cruzan Alexander; Donald M. Sell; Terryl K. Qualey

[57] ABSTRACT

A method for making a molded high voltage splice body by positioning a conductive elastomeric electrode on a mandrel, positioning an extruded conductive elastomeric sleeve over the elastomeric electrode, sealing the ends of the elastomeric sleeve, placing the mandrel with the electrode and sleeve on it into a mold, injecting a curable insulating compound between the electrode and the sleeve under pressure and curing the insulating compound.

3 Claims, 6 Drawing Figures

MOLDED HIGH VOLTAGE SPLICE BODY

FIELD OF THE INVENTION

The present invention relates to a method for making a molded high voltage splice body that may be used to provide anticorona discharge shielding for high voltage cable splices.

BACKGROUND OF THE INVENTION

In the transmission of currents at high voltage, and particularly in distribution systems which are underground, numerous splices or connections are necessary. These are conveniently effected using metallic sleeves crimped to bare ends of the cables followed by applying suitable insulation and shielding. A major problem in such splices is the occurrence of corona discharge in air pockets around the splice. Such discharge tends to rapidly deteriorate cable insulation and cause premature failure of the splice.

U.S. Pat. No. 4,241,004 describes an improved high voltage splice body and an economical method for manufacturing it. In the method of the patent insulating compound is injected into a mold in which end caps are spaced on a mandrel between which an electrode is centrally positioned on the mandrel. After the insulating compound is cured and the assembly is taken from the mold, an elastomeric tube is placed over the molded part bridging the end caps. It has been found that this method has three drawbacks. First, the elastomeric tube must be stretched as it is placed into position over the molded part so that it applies pressure to make intimate contact with the insulating compound. With larger diameter splice bodies this pressure produces significant hoop stress in the part making a field installation on a splice more difficult. Second, the inner surface of the mold must be plated to prevent the insulating compound from adhering to it, and it as been found that the pressures at which insulating compound is injected into the mold wears away the protective coating after a period of time. Finally, because the insulating compound is in direct contact with the mold, backrinding (i.e. small tears along the mold parting line) will occur in the insulating compound at lower mold temperatures than those at which it would be desirable to cure the insulating compound to maximize production.

SUMMARY OF THE INVENTION

The present invention provides a method for making a molded high voltage splice body by positioning a conductive elastomeric electrode on a mandrel, providing an extruded, resiliently expandable, conductive elastomeric sleeve with a reinforced injection insert, and positioning the elastomeric sleeve over the elastomeric electrode on the mandrel. The ends of the elastomeric sleeve are sealed around the mandrel and the mandrel is placed with the electrode and sleeve on it into a mold. A curable insulating compound is then injected through the reinforced injection insert between the electrode and the sleeve under pressure to expand the sleeve against the interior of the mold and to force the insulating compound into intimate contact with the exterior of the electrode and the interior of the sleeve. Finally, the insulating compound is cured.

Use of the conductive elastomeric sleeve in the mold and injecting the insulating compound through it allows the mold backing up the sleeve to absorb the pressure of the insulating compound necessary to create the intimate contact between the insulating compound and the sleeve, thereby eliminating the need for stretching the sleeve to create the intimate contact between the sleeve and the insulating compound. The elastomeric sleeve also provides a layer between the insulating compound and the mold to eliminate the insulating compound abrasion and it permits elevated molding temperatures since the insulating compound is not in contact with the mold and therefore backrinding of the insulating compound cannot occur.

THE DRAWING

DESCRIPTION OF THE PREFERRED EMBODIMENT

Figure 1:
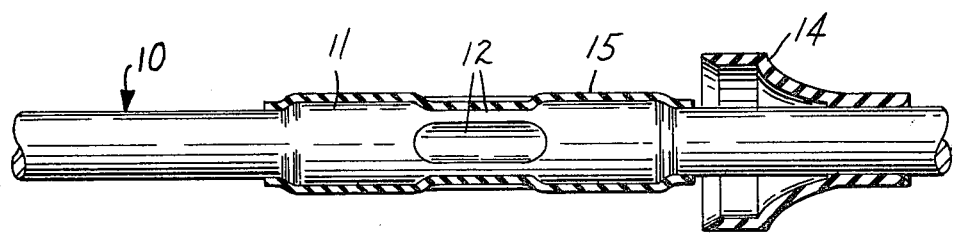
FIG. 1 is a longitudinal cross sectional view of initial steps in the method of the present invention.
Figure 2:
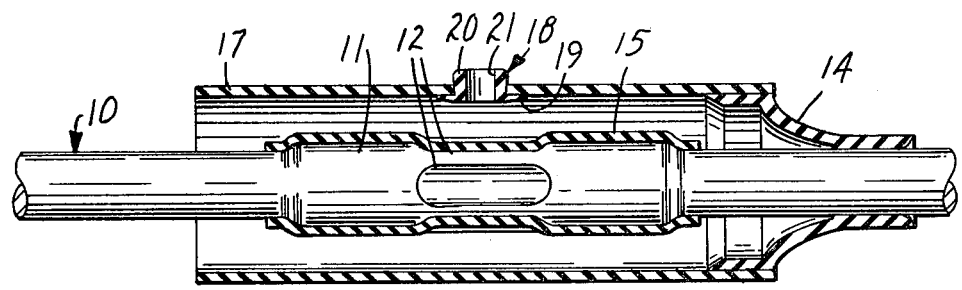
FIG. 2 is a longitudinal cross sectional view of a subsequent step.
Figure 3:
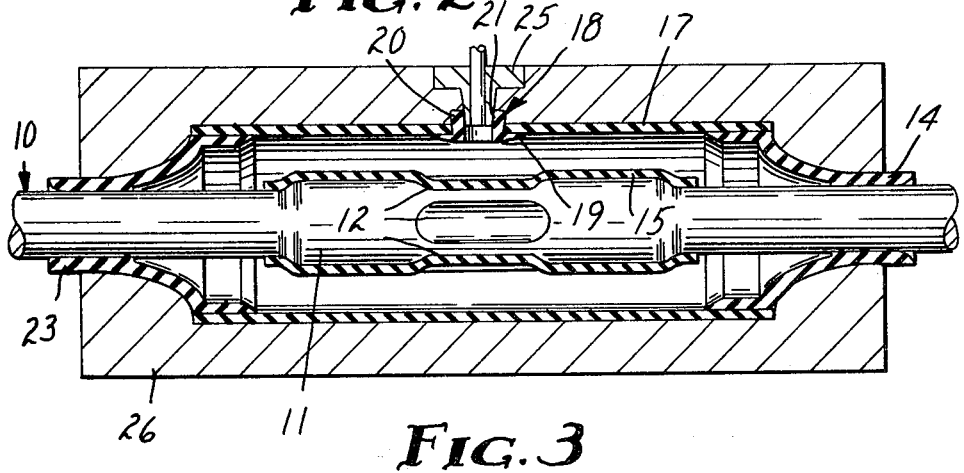
FIG. 3 is a longitudinal cross sectional view of a step in the method of the invention just prior to injection of the insulating compound.
Figure 4:
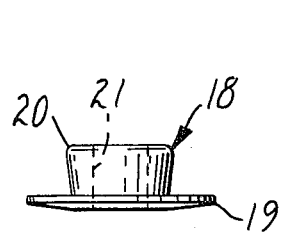
FIGS. 4 and 5 are side elevation and top views of the reinforced injection insert in the conductive elastomeric sleeve used in the method of the invention.
Figure 5:
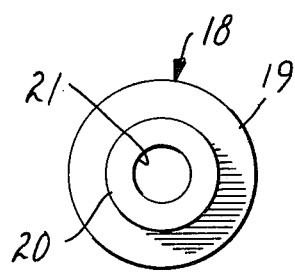

In the preferred method of the present invention a mandrel 10 is utilized which has an area 11 of increased diameter which is formed centrally with four depressions 12. A first end cap 14 is slid onto one end of the mandrel 10 spaced from the enlarged portion 56 as illustrated in FIG. 1. An extruded, conductive elastomeric sleeve 15 having a diameter slightly smaller than the major portion of the mandrel 10 is stretched and slid onto the mandrel to span the enlarged portion 11 of the mandrel. In the completed splice body the sleeve 15 will form the electrode. Alternately, the electrode may be a molded part.

An extruded, resiliently expandable, conductive elastomeric sleeve 17 is next slid onto the mandrel into position over the elastomeric electrode 15. This sleeve will form the outer sleeve of the completed splice body. It has an internal diameter the same as the external diameter of the end cap 14 and as it is slid into position on the mandrel one of its ends overlaps the exterior of the end cap 14. Prior to being slid onto the mandrel 10, the outer sleeve 17 has had a circular aperture formed in its wall centrally of its length into which is pressed a reinforced injection insert 18. The preferred injection insert is formed of a resilient elastomer and has a circular base 19 and a generally cylindrical body 20 which tapers outward away from the base 19 from a diameter generally equal to the diameter of the aperture in the outer sleeve 17 to a slightly greater diameter so that the insert 18 can be pressed into the aperture in the outer sleeve 17 from the interior of the sleeve and the taper of the body 20 will cause the insert 18 to be retained in the aperture in the sleeve 17. An insulating compound injection aperture 21 is formed axially through the injection insert 18.

A second end cap 23 is next slid onto the mandrel 10 and into the end of the outer sleeve 17. Both ends of the outer sleeve 17 are then sealed. Alternatively, the ends of the outer sleeve 17 may be self-sealing around the mandrel 10 if the outer sleeve 17 is formed of a material that is sufficiently stretchable so that it can conform to the mandrel at the ends and be spaced from the electrode sleeve 15 centrally. In such case, some means must be provided to space the outer sleeve 17 from the electrode sleeve 15 so that insulating compound can be injected between them.

An insulating compound injection nozzle 25 is force fit into the aperture 21 in the injection insert 18 and the assemblage is then placed into a mold 26 which has a cavity of the same shape as the exterior of the assemblage. The mold is clamped shut and insulating compound is injected through the nozzle 25 between the outer sleeve 17 and the electrode sleeve 15 under a pressure of about 2900 Newtons per square centimeter. When the space between the outer sleeve 17 and the electrode sleeve 15 is filled the insulating compound pressure forces the electrode sleeve 15 to conform intimately to the mandrel 10, including the enlarged portion 11 and the depressions 12, and it expands the outer sleeve 17 against the interior of the mold 26. This also forces the insulating compound 28 into intimate contact with the exterior of the electrode sleeve 15 and the interior of the outer sleeve 17 to eliminate voids. Finally, the insulating compound is cured.

The electrode sleeve 15 and the outer sleeve 17 are preferably extruded EPDM rubber containing carbon black for conductivity to provide effective electrical shielding, and the insulating compound is preferably EPDM rubber containing inorganic fillers and curing agents, all of which are commonly used in high voltage splice bodies. It has been found that in using the method of the present invention the mold temperature may be 175° C. to 180° C. as opposed to 155° C. in the method of U.S. Pat. No. 4,241,004, reducing the time from which the mold cavity is filled until the time it can be opened from twelve minutes to nine minutes.

Figure 6:
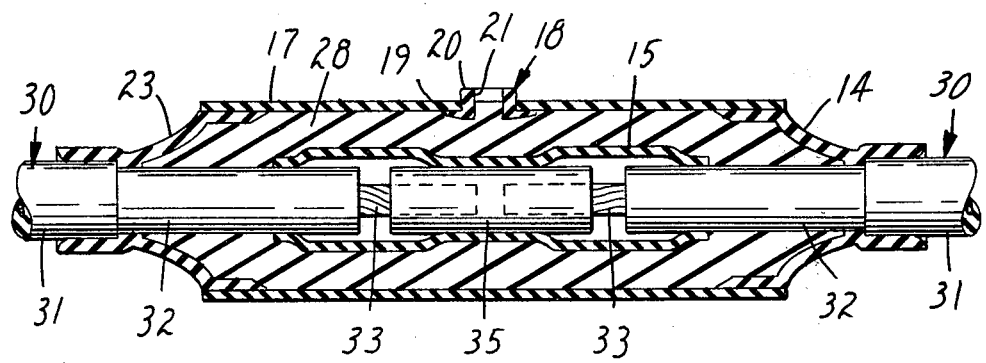
FIG. 6 is a longitudinal cross sectional view of a molded high voltage splice body made in accordance with the present invention and illustrated in use.

FIG. 6 illustrates the use of a high voltage splice body constructed in accordance with the method of the present invention in splicing together two distribution cables 30. Each cable 30, has an outer semiconductive cover 31, an insulative layer 32 and a stranded wire conductor 33. The splice body is slid onto one of the cables 30, the conductors 33 are joined by a metal sleeve 35 and the splice body is then slid over the splice into the position illustrated in FIG. 6.

I claim:

1. A method for making a molded high voltage splice body comprising the steps of
   positioning a conductive elastomeric electrode on a mandrel,
   providing an extruded, resiliently expandable, conductive elastomeric sleeve with a reinforced injection insert,
   positioning the elastomeric sleeve over the elastomeric electrode on the mandrel,
   sealing the ends of the elastomeric sleeve around the mandrel,
   placing the mandrel with the electrode and sleeve on it into a mold,
   injecting a curable insulating compound through the reinforced injection insert between the electrode and the sleeve under pressure to expand the sleeve against the interior of the mold and to force the insulating compound into intimate contact with the exterior of the electrode and the interior of the sleeve, and
   curing the insulating compound.

2. The method of claim 1 wherein said step of sealing the ends of the elastomeric sleeve comprises placing a pair of molded elastomeric end caps on the mandrel, one at each end of the sleeve.

3. The method of claim 1 wherein the electrode is an extruded elastomeric sleeve and said step of injecting a curable insulating compound forces the material of the electrode to conform to the exterior shape of the mandrel.

* * * * *